(12) United States Patent
Chen

(10) Patent No.: US 10,777,163 B2
(45) Date of Patent: Sep. 15, 2020

(54) DRIVING METHOD OF DISPLAY PANEL AND DISPLAY APPARATUS

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/341,551

(22) PCT Filed: Sep. 20, 2017

(86) PCT No.: PCT/CN2017/102460
§ 371 (c)(1),
(2) Date: Apr. 12, 2019

(87) PCT Pub. No.: WO2019/006883
PCT Pub. Date: Jan. 10, 2019

(65) Prior Publication Data
US 2019/0325837 A1 Oct. 24, 2019

(30) Foreign Application Priority Data
Jul. 6, 2017 (CN) .......................... 20170548428.3

(51) Int. Cl.
*G09G 3/36* (2006.01)
*G02F 1/13363* (2006.01)
*G02F 1/139* (2006.01)

(52) U.S. Cl.
CPC ......... *G09G 3/3696* (2013.01); *G02F 1/1395* (2013.01); *G02F 1/133634* (2013.01);
(Continued)

(58) Field of Classification Search
CPC ........... G09G 3/3648; G09G 2320/028; G09G 2300/0443; G09G 3/3607;
(Continued)

(56) References Cited

U.S. PATENT DOCUMENTS

2017/0169753 A1* 6/2017 Hao ..................... G09G 3/2018
2018/0018938 A1* 1/2018 Lee ...................... G09G 3/2074
2018/0218705 A1* 8/2018 Huang ................. G09G 3/3685

* cited by examiner

*Primary Examiner* — Sanjiv D. Patel
(74) *Attorney, Agent, or Firm* — WPAT, PC

(57) ABSTRACT

A driving method of display panel and a display apparatus are provided. In the driving method, unequal first and second voltage signals for sub-pixels are obtained. Image input signals include first and second images adjacent in timing. In the first image, the first and second voltage signals of a first sub-pixel of a first pixel group respectively drive first sub-pixels of first and second pixel groups, and the second and first voltage signals of a second sub-pixel of the second pixel group respectively drive second sub-pixels of first and second pixel groups. In the second image, the second and first voltage signals of the first sub-pixel of the second pixel group respectively drive first sub-pixels of first and second pixel groups, and the first and second voltage signals of the second sub-pixel of the first pixel group respectively drive second sub-pixels of first and second pixel groups.

18 Claims, 5 Drawing Sheets

(52) U.S. Cl.
CPC ..... *G09G 3/364* (2013.01); *G09G 2300/0447* (2013.01); *G09G 2320/0285* (2013.01); *G09G 2360/16* (2013.01)

(58) Field of Classification Search
CPC ............. G09G 2300/0447; G09G 3/36; G09G 3/2025; G09G 2320/0673
See application file for complete search history.

S110 — dividing pixels on the display panel into a plurality of pairs of pixel groups, wherein each pair of pixel groups comprises a first pixel group and a second pixel group, and each of the first pixel group and the second pixel group comprises a first sub-pixel, a second sub-pixel and a third sub-pixel S120 — obtaining a first voltage signal and a second voltage signal corresponding to sub-pixels by table lookup according to image input signals, so as to make a mixed luminance at a front viewing angle when the sub-pixels are alternately driven by the first voltage signal and the second voltage be equivalent to a luminance at the front viewing angle when the sub-pixels are driven by the image input signals, wherein the image input signals comprise a first image and a second image adjacent in timing, and the first voltage signal is unequal to the second voltage signal S130 — using the first voltage signal and the second voltage signal corresponding to the first sub-pixel of the first pixel group in the first image to respectively drive the first sub-pixel of the first pixel group and the first sub-pixel of the second pixel group in the first image, and using the second voltage signal and the first voltage signal corresponding to the second sub-pixel of the second pixel group in the first image to respectively drive the second sub-pixel of the first pixel group and the second sub-pixel of the second pixel group in the first image S140 — using the second voltage signal and the first voltage signal corresponding to the first sub-pixel of the second pixel group in the second image to respectively drive the first sub-pixel of the first pixel group and the first sub-pixel of the second pixel group in the second image, and using the first voltage signal and the second voltage signal of the second sub-pixel of the first pixel group in the second image to respectively drive the second sub-pixel of the first pixel group and the second sub-pixel of the second pixel group in the second image

DRIVING METHOD OF DISPLAY PANEL AND DISPLAY APPARATUS

FIELD OF THE DISCLOSURE

The disclosure relates to the field of display technology, and more particularly to a driving method of a display panel and a display apparatus.

BACKGROUND

Current large-sized liquid crystal display panels mostly adopt negative VA (vertical alignment) liquid crystal technology or IPS (in-plane switching) liquid crystal technology. Compared with the IPS liquid crystal technology, the VA liquid crystal technology has advantages of higher production efficiency and lower manufacturing cost. However, in the aspect of optical property, compared with IPS liquid crystal technology, the VA liquid crystal technology has an obvious defect of optical property, especially for large-sized panels in commercial applications requiring larger viewing angle.

Luminances at large viewing angles would be rapidly saturated with voltage during driving the VA-type liquid crystal, which results in contrast and color shift of image at large viewing angles are worsen more seriously than the front-view image quality.

SUMMARY

Therefore, the disclosure provides a driving method of a display panel and a display apparatus capable of solving color shift at large viewing angles.

In particular, a driving method of a display panel includes:
dividing pixels on the display panel into a plurality of pairs of pixel groups, wherein each pair of pixel groups includes a first pixel group and a second pixel group, and each of the first pixel group and the second pixel group includes a first sub-pixel, a second sub-pixel and a third sub-pixel;

obtaining a first voltage signal and a second voltage signal corresponding to sub-pixels by table lookup according to image input signals, to make a mixed luminance at a front viewing angle when the sub-pixels are alternately driven by the first voltage signal and the second voltage be equivalent to a luminance at the front viewing angle when the sub-pixels are driven by the image input signals, wherein the image input signals include a first image and a second image adjacent in timing, and the first voltage signal is unequal to the second voltage signal;

using the first voltage signal and the second voltage signal corresponding to the first sub-pixel of the first pixel group in the first image to respectively drive the first sub-pixel of the first pixel group and the first sub-pixel of the second pixel group in the first image, and using the second voltage signal and the first voltage signal corresponding to the second sub-pixel of the second pixel group in the first image to respectively drive the second sub-pixel of the first pixel group and the second sub-pixel of the second pixel group in the first image; and using the second voltage signal and the first voltage signal corresponding to the first sub-pixel of the second pixel group in the second image to respectively drive the first sub-pixel of the first pixel group and the first sub-pixel of the second pixel group in the second image, and using the first voltage signal and the second voltage signal of the second sub-pixel of the first pixel group in the second image to respectively drive the second sub-pixel of the first pixel group and the second sub-pixel of the second pixel group in the second image.

In an embodiment, the first sub-pixel is a red sub-pixel, and the second sub-pixel is a green sub-pixel.

In an embodiment, the third sub-pixel is a blue sub-pixel. The driving method further includes:

using the first voltage signal and the second voltage signal of the blue sub-pixel of the first pixel group in the first image to respectively drive the blue sub-pixel of the first pixel group and the blue sub-pixel of the second pixel group in the first image, and using the second voltage signal and the first voltage signal of the blue sub-pixel of the second pixel group in the second image to respectively drive the blue sub-pixel of the first pixel group and the blue sub-pixel of the second pixel group in the second image; or, using the second voltage signal and the first voltage signal of the blue sub-pixel of the second pixel group in the first image to respectively drive the blue sub-pixel of the first pixel group and the blue sub-pixel of the second pixel group in the first image, and using the first voltage signal and the second voltage signal of the blue sub-pixel of the first pixel group in the second image to respectively drive the blue sub-pixel of the first pixel group and the blue sub-pixel of the second pixel group in the second image.

In an embodiment, the first pixel group and the second pixel group are located in a same row and adjacent to each other; and in adjacent two pairs of pixel groups, the first pixel group of one pair of pixel groups is disposed adjacent to the second pixel group of the other pair of pixel groups.

In an embodiment, the first pixel group and the second pixel group are located in a same column and adjacent to each other; and in adjacent two pairs of pixel groups, the first pixel group of one pair of pixel groups is disposed adjacent to the second pixel group of the other pair of pixel groups.

Moreover, a display apparatus includes: a
display panel, wherein pixels on the display panel are divided into a plurality of pairs of pixel groups, each pair of pixel groups includes a first pixel group and a second pixel group, and each of the first pixel group and the second pixel group includes a first sub-pixel, a second sub-pixel and a third sub-pixel;

a control part, configured to obtain a first voltage signal and a second voltage signal corresponding to sub-pixels by table lookup according to image input signals, to make a mixed luminance at a front viewing angle when the sub-pixels are alternately driven by the first voltage signal and the second voltage be equivalent to a luminance at the front viewing angle when the sub-pixels are driven by the image input signals, wherein the image input signals include a first image and a second image adjacent in timing, and the first voltage signal is unequal to the second voltage signal; and a driving part, connected to the control part and the display panel and configured for: using the first voltage signal and the second voltage signal corresponding to the first sub-pixel of the first pixel group in the first image to respectively drive the first sub-pixel of the first pixel group and the first sub-pixel of the second pixel group in the first image, using the second voltage signal and the first voltage signal corresponding to the second sub-pixel of the second pixel group in the first image to respectively drive the second sub-pixel of the first pixel group and the second sub-pixel of the second pixel group in the first image, using the second voltage signal and the first voltage signal corresponding to the first sub-pixel of the second pixel group in the second image to respectively drive the first sub-pixel of the first pixel group and the first sub-pixel of the second pixel group in the second image, and using the first voltage signal and the second voltage signal of the second sub-pixel of the first pixel group in the second image to respectively drive the second sub-pixel of the first pixel group and the second sub-pixel of the second pixel group in the second image.

In an embodiment, the first sub-pixel is a red sub-pixel, and the second sub-pixel is a green sub-pixel.

In an embodiment, the third sub-pixel is a blue sub-pixel; and the driving part is further configured for using the first voltage signal and the second voltage signal of the blue sub-pixel of the first pixel group in the first image to respectively drive the blue sub-pixel of the first pixel group and the blue sub-pixel of the second pixel group in the first image, and using the second voltage signal and the first voltage signal of the blue sub-pixel of the second pixel group in the second image to respectively drive the blue sub-pixel of the first pixel group and the blue sub-pixel of the second pixel group in the second image; or the driving part is further configured for using the second voltage signal and the first voltage signal of the blue sub-pixel of the second pixel group in the first image to respectively drive the blue sub-pixel of the first pixel group and the blue sub-pixel of the second pixel group in the first image, and using the first voltage signal and the second voltage signal of the blue sub-pixel of the first pixel group in the second image to respectively drive the blue sub-pixel of the first pixel group and the blue sub-pixel of the second pixel group in the second image.

In an embodiment, the first pixel group and the second pixel group are located in a same column and adjacent to each other; and in adjacent two pairs of pixel groups, the first pixel group of one pair of pixel groups is disposed adjacent to the second pixel group of the other pair of pixel groups.

In addition, a display apparatus includes:

a display panel, wherein pixels on the display panel are divided into a plurality of pairs of pixel groups, each pair of pixel groups includes a first pixel group and a second pixel group adjacent to each other, each of the first pixel group and the second pixel group includes a first sub-pixel, a second sub-pixel and a third sub-pixel; the first pixel group and the second pixel group are adjacently disposed in a same row or a same column; in adjacent two pairs of pixel groups, the first pixel group in one pair of pixel groups is adjacent to the second pixel group in the other one pair of pixel groups; the first sub-pixel is a red sub-pixel, the second sub-pixel is a green sub-pixel, and the third sub-pixel is a blue sub-pixel;

a control part, configured to obtain a first voltage signal and a second voltage signal corresponding to sub-pixels by table lookup according to image input signals, to make a mixed luminance at a front viewing angle when the sub-pixels alternately driven by the first voltage signal and the second voltage be equivalent to a luminance at the front viewing angle when the sub-pixels are driven by the image input signals, wherein the image input signals include a first image and a second image adjacent in timing, and the first voltage signal is unequal to the second voltage signal; and a driving part, connected to the control part and the display panel and configured for: using the first voltage signal and the second voltage signal corresponding to the first sub-pixel of the first pixel group in the first image to respectively drive the first sub-pixel of the first pixel group and the first sub-pixel of the second pixel group in the first image, using the second voltage signal and the first voltage signal corresponding to the second sub-pixel of the second pixel group in the first image to respectively drive the second sub-pixel of the first pixel group and the second sub-pixel of the second pixel group in the first image, using the second voltage signal and the first voltage signal corresponding to the first sub-pixel of the second pixel group in the second image to respectively drive the first sub-pixel of the first pixel group and the first sub-pixel of the second pixel group in the second image, and using the first voltage signal and the second voltage signal of the second sub-pixel of the first pixel group in the second image to respectively drive the second sub-pixel of the first pixel group and the second sub-pixel of the second pixel group in the second image;

the driving part is further configured for: using the first voltage signal and the second voltage signal of the blue sub-pixel of the first pixel group in the first image to respectively drive the blue sub-pixel of the first pixel group and the blue sub-pixel of the second pixel group in the first image, and use the second voltage signal and the first voltage signal of the blue sub-pixel of the second pixel group in the second image to respectively drive the blue sub-pixel of the first pixel group and the blue sub-pixel of the second pixel group in the second image; or, the driving part is further configured for using the second voltage signal and the first voltage signal of the blue sub-pixel of the second pixel group in the first image to respectively drive the blue sub-pixel of the first pixel group and the blue sub-pixel of the second pixel group in the first image, and use the first voltage signal and the second voltage signal of the blue sub-pixel of the first pixel group in the second image to respectively drive the blue sub-pixel of the first pixel group and the blue sub-pixel of the second pixel group in the second image.

In the above driving method of a display panel and the display apparatuses, pixels on the display panel are divided into multiple pairs of pixel groups, each pair of pixel groups includes adjacent first pixel group and second pixel group; the first pixel group and the second pixel group each include a first sub-pixel, a second sub-pixel and a third sub-pixel; a first voltage signal and a second voltage signal of one high and one low corresponding to sub-pixels are obtained by table lookup according to image input signals, a mixed luminance at a front viewing angle when the sub-pixels are alternately driven by the first voltage signal and the second voltage signal is equivalent to a luminance at the front viewing angle when the sub-pixels are driven by the image input signals. The image input signals includes a first image and a second image adjacent in timing. In the first image, the first sub-pixels of the first pixel group and the second pixel group respectively obtain one high voltage signal and one low voltage signal, the second sub-pixels of the first pixel group and the second pixel group respectively obtain one low voltage signal and one high voltage signal; and in the second image, the first sub-pixels of the first pixel group and the second pixel group respectively obtain one low voltage signal and one high voltage signal, the second sub-pixels of the first pixel group and the second pixel group respectively obtain one high voltage signal and one low voltage signal. As a result, it not only can maintain resolution but also achieve color shift compensation during image content presentation at the frequency of original image input signals, and moreover the exchange of positions of sub-pixels representing resolution signals in the first and second images with adjacent timings can realize better resolution maintenance and retain a complete image resolution.

BRIEF DESCRIPTION OF THE DRAWINGS

One or more embodiments will be illustrated by exemplary descriptions with reference to figures in the accompanying drawings, and these exemplary descriptions are not to be construed as limiting the embodiments. Components or elements with same reference numerals in the drawings represent similar components or elements. Unless otherwise stated, the figures in the drawings are not given a scale limitation.

FIG. 4 is a flowchart of a driving method of a display panel according to another embodiment.

DETAILED DESCRIPTION OF EMBODIMENTS

In order to make objectives, technical solutions and advantages of the disclosure more comprehensible, the disclosure is further described in detail below with reference to accompanying drawings and embodiments. It should be understood that the specific embodiments described herein are merely for illustration of the disclosure but are not intended to limit the disclosure.

Figure 1:
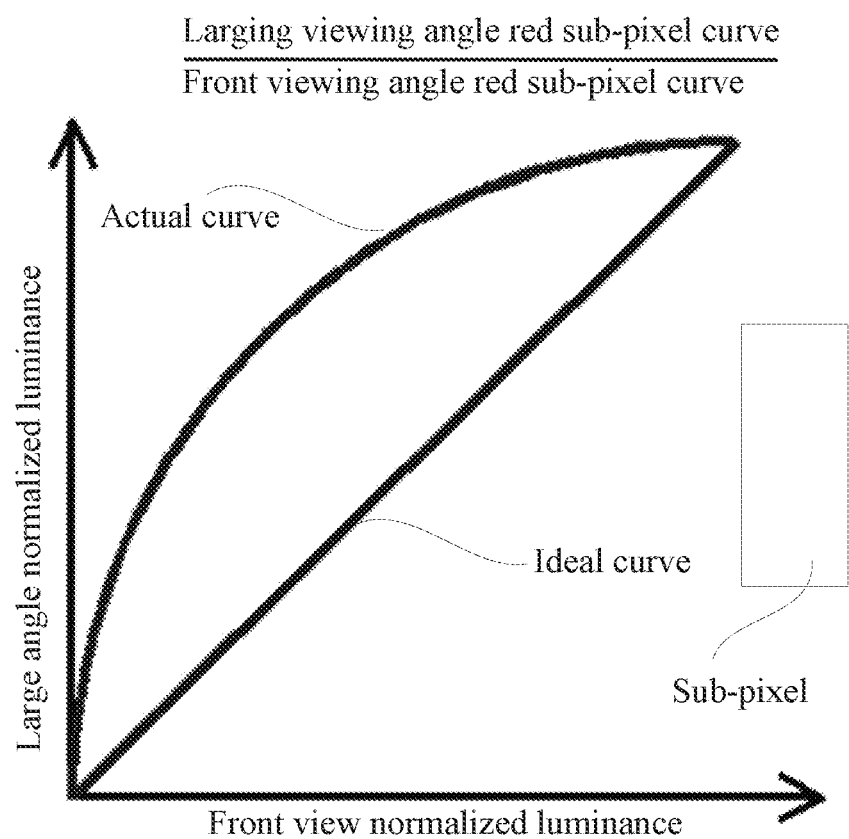
FIG. 1 is an exemplary curve diagram associated with front view and large-angle view of a sub-pixel.

Referring to FIG. 1, during driving a VA type liquid crystal, luminances at large viewing angles are rapidly saturated with voltage, as denoted by L20 curve (corresponding to the actual curve) in FIG. 1, which results in contrast and color shift of image at large viewing angles are worsen more seriously than the front-view image quality. A curve of front-view luminance versus voltage is denoted by L10 curve (corresponding to the ideal curve) in FIG. 1.

Figure 2:
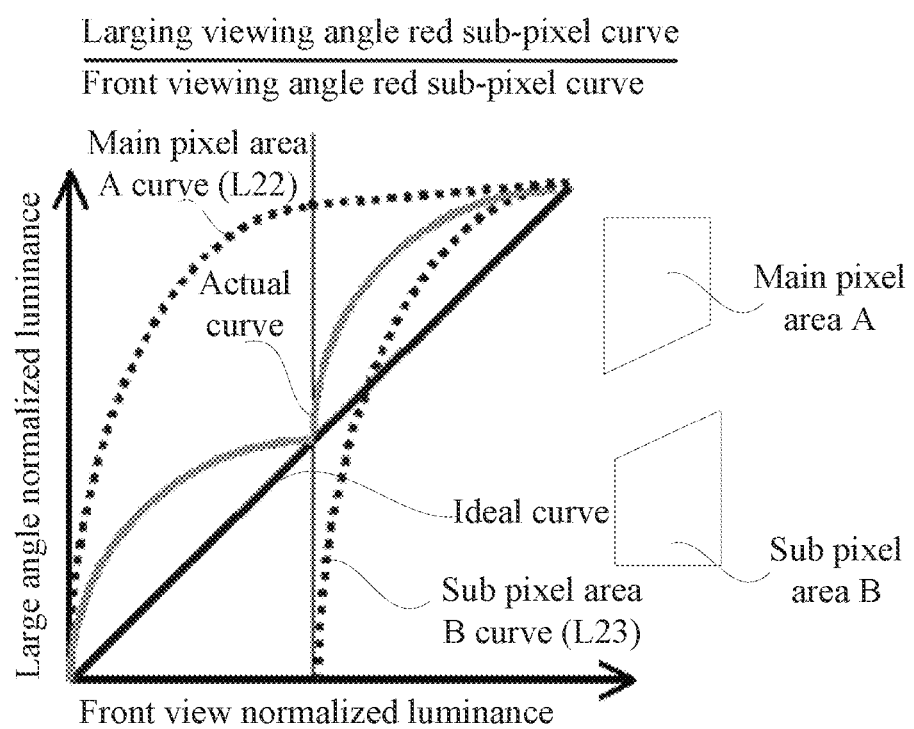
FIG. 2 is a curve diagram associated with front view and large-angle view of a main pixel area and a sub pixel area according to an embodiment.
Figure 3:
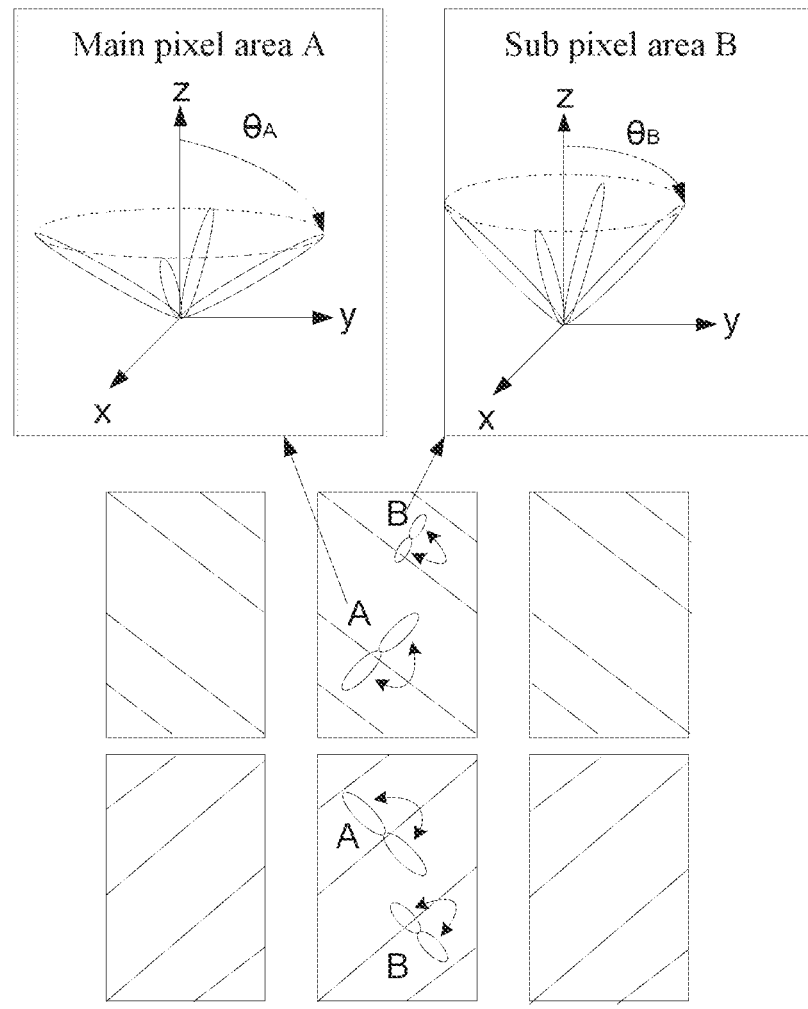
FIG. 3 is a schematic view of motions of liquid crystal molecules.

In the VA type liquid crystal technology, in order to solve the color shift at large viewing angles, RGB sub-pixels each are divided into a main pixel area A and a sub pixel area B, the main pixel area and the sub pixel area are spatially applied with different driving voltages. FIG. 2 is a curve diagram associated with a main pixel and a sub pixel area divided from one sub-pixel. As seen from FIG. 2, it can found that the solution of dividing one sub-pixel into the main pixel area and the sub pixel area can effectively overcome the drawback of color shift. As a result, the change of overall large viewing angle along with voltage is close to the front view, a L21 curve (corresponding to the actual curve) of large viewing angle luminance versus voltage in FIG. 2 is close to a L11 curve (corresponding to the ideal curve) of luminance versus voltage in FIG. 2, L22 and L23 respectively are curves associated with the main pixel area A and the sub pixel area B. FIG. 3 is a schematic view of motions of liquid crystal molecules of RGB sub-pixels at different situations of a low grayscale, a middle grayscale and a high grayscale, and the motions in the main pixel area A and the sub pixel area B of the liquid crystal molecules of the green sub-pixel G at the middle grayscale are shown in detail in FIG. 3. However, such pixel design requires designing a metal wire or a TFT component to drive the sub pixel area, which would result in the sacrifice of light-transmissive opening area and the decrease of panel transmittance, so that a direct result is the increase of backlight cost.

Referring to FIG. 4, a driving method of a display panel includes following steps of:

S110: dividing pixels on a display panel into multiple (i.e., more than one) pairs of pixel groups; each pair of pixel groups including a first pixel group and a second pixel group adjacent to each other, and the first pixel group and the second pixel group each including a first sub-pixel, a second sub-pixel and a third sub-pixel;

S120: obtaining a first voltage signal and a second voltage signal corresponding to sub-pixels by table lookup according to image input signals, to make a mixed luminance at a front viewing angle when the sub-pixels are alternately driven by the first voltage signal and the second voltage signal be equivalent to a luminance at the front viewing angle when the sub-pixels are driven by the image input signals, wherein the image input signals include a first image and a second image adjacent to each other in timing, and the first voltage signal is unequal to the second voltage signal;

S130: using the first voltage signal and the second voltage signal of the first sub-pixel of the first pixel group in the first image to respectively drive the first sub-pixel of the first pixel group and the first sub-pixel of the second pixel group in the first image, and using the second voltage signal and the first voltage signal of the second sub-pixel of the second pixel group in the first image to respectively drive the second sub-pixel of the first pixel group and the second sub-pixel of the second pixel group in the first image;

S140: using the second voltage signal and the first voltage signal of the first sub-pixel of the second pixel group in the second image to respectively drive the first sub-pixel of the first pixel group and the first sub-pixel of the second pixel group in the second image, and using the first voltage signal and the second voltage signal of the second sub-pixel of the first pixel group in the second image to respectively drive the second sub-pixel of the first pixel group and the second sub-pixel of the second pixel group in the second image.

In the first image, the first sub-pixel of the first pixel group and the first sub-pixel of the second pixel group respectively obtain a high voltage signal and a low voltage signal, the second sub-pixel of the first pixel group and the second sub-pixel of the second pixel group respectively obtain a low voltage signal and a high voltage signal. In the second image, the first sub-pixel of the first pixel group and the first sub-pixel of the second pixel group respectively obtain a low voltage signal and a high voltage signal, the second sub-pixel of the first pixel group and the second sub-pixel of the second pixel group respectively obtain a high voltage signal and a low voltage signal. As a result, it not only can maintain resolution but also achieve color shift compensation during image content presentation at the frequency of original image input signals, and moreover the exchange of positions of sub-pixels representing resolution signals in the first and second images with adjacent timings can realize better resolution maintenance and retain a complete image resolution. The first sub-pixel is a red sub-pixel, and the second sub-pixel is a green sub-pixel. In RGB three-primary-color sub-pixels, because luminance signals of the red sub-pixel and the green sub-pixel are brighter than a luminance signal of the blue sub-pixel, the red sub-pixel and the green sub-pixel would directly affect the presentation of viewing image resolution. Therefore, in the first image, the red sub-pixels of the first pixel group and the second pixel group respectively obtain a high voltage signal and a low voltage signal, and the green sub-pixels of the first pixel group and the second pixel group respectively obtain a low voltage signal and a high voltage signal. In the second image, the red sub-pixels of the first pixel group and the second pixel group respectively obtain a low voltage signal and a high voltage signal, and the green sub-pixels of the first pixel group and the second pixel group respectively obtain a high voltage signal and a low voltage signal. Therefore, it not only can maintain resolution but also achieve color shift compensation during image content presentation at the frequency of original image input signals, and moreover the exchange of positions of sub-pixels representing resolution signals in the first and second images with adjacent timings can realize better resolution maintenance and retain a complete image resolution.

The step S120 specifically is that obtaining unequal first and second voltage signals corresponding to each sub-pixel as per a predetermined rule according to image input signals, a mixed luminance at a front viewing angle when sub-pixels are alternately driven by the first voltage signal and the second voltage signal being equivalent to a luminance at the front viewing angle when the sub-pixels are driven by the image input signals, and the image input signals including a first image and a second image adjacent to each other in timing.

In particular, the first image and the second image adjacent in timing and included in the image input signals are exemplarily shown in Table 1 and Table 2.

TABLE 1

| $R_{1,1}$ | $G_{1,1}$ | $B_{1,1}$ | $R_{1,2}$ | $G_{1,2}$ | $B_{1,2}$ | $R_{1,3}$ | $G_{1,3}$ | $B_{1,3}$ |
|---|---|---|---|---|---|---|---|---|
| $R_{2,1}$ | $G_{2,1}$ | $B_{2,1}$ | $R_{2,2}$ | $G_{2,2}$ | $B_{2,2}$ | $R_{2,3}$ | $G_{2,3}$ | $B_{2,3}$ |
| $R_{3,1}$ | $G_{3,1}$ | $B_{3,1}$ | $R_{3,2}$ | $G_{3,2}$ | $B_{3,2}$ | $R_{3,3}$ | $G_{3,3}$ | $B_{3,3}$ |
| $R_{4,1}$ | $G_{4,1}$ | $B_{4,1}$ | $R_{4,2}$ | $G_{4,2}$ | $B_{4,2}$ | $R_{4,3}$ | $G_{4,3}$ | $B_{4,3}$ |
| $R_{5,1}$ | $G_{5,1}$ | $B_{5,1}$ | $R_{5,2}$ | $G_{5,2}$ | $B_{5,2}$ | $R_{5,3}$ | $G_{5,3}$ | $B_{5,3}$ |

TABLE 2

| $R_{1,1}'$ | $G_{1,1}'$ | $B_{1,1}'$ | $R_{1,2}'$ | $G_{1,2}'$ | $B_{1,2}'$ | $R_{1,3}'$ | $G_{1,3}'$ | $B_{1,3}'$ |
|---|---|---|---|---|---|---|---|---|
| $R_{2,1}'$ | $G_{2,1}'$ | $B_{2,1}'$ | $R_{2,2}'$ | $G_{2,2}'$ | $B_{2,2}'$ | $R_{2,3}'$ | $G_{2,3}'$ | $B_{2,3}'$ |
| $R_{3,1}'$ | $G_{3,1}'$ | $B_{3,1}'$ | $R_{3,2}'$ | $G_{3,2}'$ | $B_{3,2}'$ | $R_{3,3}'$ | $G_{3,3}'$ | $B_{3,3}'$ |
| $R_{4,1}'$ | $G_{4,1}'$ | $B_{4,1}'$ | $R_{4,2}'$ | $G_{4,2}'$ | $B_{4,2}'$ | $R_{4,3}'$ | $G_{4,3}'$ | $B_{4,3}'$ |
| $R_{5,1}'$ | $G_{5,1}'$ | $B_{5,1}'$ | $R_{5,2}'$ | $G_{5,2}'$ | $B_{5,2}'$ | $R_{5,3}'$ | $G_{5,3}'$ | $B_{5,3}'$ |

Moreover, when a RGB three-primary-color display panel is taken as an example, the red sub-pixel is taken for illustration, a red sub-pixel signal $R_{i,j}$ is decomposed into image frames of a high voltage $RH_{i,j}$ and a low voltage $RL_{i,j}$, the high voltage image frame and the low voltage image frame are sequentially displayed in adjacent two timings, and a synthesis effect of the high voltage image frame and the low voltage image frame is equivalent to luminances of sub-pixels of the original image frames. The high voltage image frame signal and the low voltage image frame signal replace the original image frame signals to approach the front-view luminance and keep the luminances of original image signals unchanged, by displaying the high voltage image frame and the low voltage image frame in adjacent two timings and utilizing the viewing angle characteristic of the low voltage image frame, compared with the luminance saturation phenomenon of original image frames, the top viewing angles of side view can be improved and the viewing angle color difference is improved consequently. The green sub-pixel and the blue sub-pixel may adopt the same method associated with the red sub-pixel.

The first voltage signal and the second voltage signal of one high and one low corresponding to each of the red sub-pixel R, the green sub-pixel G and the blue sub-pixel B in the image input signals are high and low voltage signal known in advance according to an input signal of each of the red sub-pixel R, the green sub-pixel G and the blue sub-pixel B, they are determined by required viewing angle compensation effect and usually is recorded in the display panel in a manner of look-up table (LUT). Furthermore, the look-up table (LUT) is recorded in a hardware frame buffer of the display panel. As seen from a 8-bit driving signal, input signals for the red sub-pixel R, the green sub-pixel G and the blue sub-pixel B may be 0-255 and thus corresponding to 256 pairs of high and low voltage signals, and therefore there are 3*256 of high voltage signals RH, GH, BH and 3*256 of low voltage signals RL, GL, BL to constitute 3*256 pairs of high and low voltage signals. Look-up tables for the blue sub-pixel are shown in Table 3.

TABLE 3

| | LUT1 | | LUT2 | |
|---|---|---|---|---|
| Input grayscale | BH1 | BL1 | BH2 | BL2 |
| 0 | 0 | 0 | 0 | 0 |
| 1 | 50 | 0 | 40 | 0 |
| 2 | 80 | 5 | 70 | 10 |
| 3 | 100 | 10 | 100 | 35 |
| 4 | 150 | 20 | 180 | 45 |
| 5 | 180 | 40 | 200 | 65 |
| . | . | . | . | . |
| . | . | . | . | . |
| . | . | . | . | . |
| 255 | 255 | 128 | 255 | 160 |

In an exemplary embodiment, a first voltage signal and a second voltage signal corresponding to each sub-pixel are obtained by table lookup according to image input signals. A mixed luminance at a front viewing angle corresponding to the first voltage signal and the second voltage signal is equivalent to a luminance at the front viewing angle corresponding to the image input signals. Based on different situations, different look-up tables may be used, for example an average value of original input grayscale values of one pair of pixel groups, an average value of original input grayscale values of multiple pairs of pixel groups and so on, and the number of look-up table according to actual needs may be multiple, e.g., 2, 5, 10 and so on. Likewise, the red sub-pixel and the green sub-pixel each may be configured with multiple look-up tables.

Furthermore, a large viewing angle luminance corresponding to the first voltage signal and the second voltage signal is as close as possible to a front viewing angle luminance corresponding to original driving data. In an embodiment, a difference value between the first voltage signal and the second voltage signal need to be greater than a preset difference value, so as to ensure two grayscale values corresponding to a target grayscale value have a large grayscale difference. In an illustrated embodiment, the large viewing angle may be defined as greater than 60 degrees, or is customized according to users.

For example, the first voltage signal is higher than the second voltage signal.

In an embodiment, exemplarily, as shown in Table 1, in the first image, the first pixel group is $R_{1,1}$, $G_{1,1}$ and $B_{1,1}$, the second pixel group is $R_{2,1}$, $G_{2,1}$ and $B_{2,1}$. As shown in Table 4, in the first image, the red sub-pixel $R_{1,1}$ of the first pixel group is driven by the first voltage signal $RH_{1,1}$ of the red sub-pixel of the first pixel group, and the red sub-pixel $R_{2,1}$ of the second pixel group is driven by the second voltage signal $RL_{1,1}$ of the red sub-pixel of the first pixel group. The green sub-pixel $G_{1,1}$ of the first pixel group is driven by the second voltage signal $GL_{2,1}$ of the green sub-pixel of the second pixel group, and the green sub-pixel $G_{2,1}$ of the second pixel group is driven by the first voltage signal $GH_{2,1}$ of the green sub-pixel of the second pixel group.

As shown in Table 2, in the second image, the first pixel group is $R_{1,1}'$, $G_{1,1}'$ and $B_{1,1}'$, the second pixel group is $R_{2,1}'$, $G_{2,1}'$ and $B_{2,1}'$. As shown in Table 5, in the second image, the red sub-pixel $R_{1,1}'$ of the first pixel group is driven by the second voltage signal $RL_{2,1}'$ of the red sub-pixel of the second pixel group, and the red sub-pixel $R_{2,1}'$ of the second pixel group is driven by the first voltage signal $RH_{2,1}'$ of the red sub-pixel of the second pixel group. The green sub-pixel $G_{1,1}'$ of the first pixel group is driven by the first voltage signal $GH_{1,1}'$ of the green sub-pixel of the first pixel group, and the green sub-pixel $G_{2,1}'$ of the second pixel group is driven by the second voltage signal $GL_{1,1}'$ of the green sub-pixel of the first pixel group.

TABLE 4

| | | | | | | | | |
|---|---|---|---|---|---|---|---|---|
| $RH_{1,1}$ | $GL_{2,1}$ | $BH_{1,1}$ | $RL_{2,2}$ | $GH_{1,2}$ | $BL_{2,2}$ | $RH_{1,3}$ | $GL_{2,3}$ | $BH_{1,3}$ |
| $RL_{1,1}$ | $GH_{2,1}$ | $BL_{1,1}$ | $RH_{2,2}$ | $GL_{1,2}$ | $BH_{2,2}$ | $RL_{1,3}$ | $GH_{2,3}$ | $BL_{1,3}$ |
| $RH_{3,1}$ | $GL_{4,1}$ | $BH_{3,1}$ | $RL_{4,2}$ | $GH_{3,2}$ | $BL_{4,2}$ | $RH_{3,3}$ | $GL_{4,3}$ | $BH_{3,3}$ |
| $RL_{3,1}$ | $GH_{4,1}$ | $BL_{3,1}$ | $RH_{4,2}$ | $GL_{3,2}$ | $BH_{4,2}$ | $RL_{3,3}$ | $GH_{4,3}$ | $BL_{3,3}$ |
| $RH_{5,1}$ | $GL_{6,1}$ | $BH_{5,1}$ | $RL_{6,2}$ | $GH_{5,2}$ | $BL_{6,2}$ | $RH_{5,3}$ | $GL_{6,3}$ | $BH_{5,3}$ |

TABLE 5

| | | | | | | | | |
|---|---|---|---|---|---|---|---|---|
| $RL_{2,1}'$ | $GH_{1,1}'$ | $BL_{2,1}'$ | $RH_{1,2}'$ | $GL_{2,2}'$ | $BH_{1,2}'$ | $RL_{2,3}'$ | $GH_{1,3}'$ | $BL_{2,3}'$ |
| $RH_{2,1}'$ | $GL_{1,1}'$ | $BH_{2,1}'$ | $RL_{1,2}'$ | $GH_{2,2}'$ | $BL_{1,2}'$ | $RH_{2,3}'$ | $GL_{1,3}'$ | $BH_{2,3}'$ |
| $RL_{4,1}'$ | $GH_{3,1}'$ | $BL_{4,1}'$ | $RH_{3,2}'$ | $GL_{4,2}'$ | $BH_{3,2}'$ | $RL_{4,3}'$ | $GH_{3,3}'$ | $BL_{4,3}'$ |
| $RH_{4,1}'$ | $GL_{3,1}'$ | $BH_{4,1}'$ | $RL_{3,2}'$ | $GH_{4,2}'$ | $BL_{3,2}'$ | $RH_{4,3}'$ | $GL_{3,3}'$ | $BH_{4,3}'$ |
| $RL_{6,1}'$ | $GH_{5,1}'$ | $BL_{6,1}'$ | $RH_{5,2}'$ | $GL_{6,2}'$ | $BH_{5,2}'$ | $RL_{6,3}'$ | $GH_{5,3}'$ | $BL_{6,3}'$ |

Such that, in the first image, the red sub-pixel $R_{1,1}$ signal of the first pixel group is retained while the red sub-pixel $R_{2,1}$ signal of the second pixel group is sacrificed. Moreover, the red sub-pixel position of the first pixel group is replaced as a high voltage signal obtained by table lookup, i.e., the first voltage signal $RH_{1,1}$, which can maintain the original image resolution. The sacrificed red sub-pixel position of the second pixel group is replaced as a low voltage signal obtained by table lookup, i.e., the second voltage signal $RL_{1,1}$, which can achieve a color shift compensation effect. In the second image, the red sub-pixel $R_{2,1}'$ of the second pixel group is retained while the red sub-pixel $R_{1,1}'$ signal of the first pixel group is sacrificed. Moreover, the red sub-pixel position of the second pixel group is replaced as a high voltage signal obtained by table lookup, i.e., the first voltage signal $RH_{2,1}'$, which can maintain the original image resolution. The sacrificed red sub-pixel position of the first pixel group is replaced as a low voltage signal obtained by table lookup, i.e., the second voltage signal $RL_{2,1}'$, which can achieve a color shift compensation effect.

Likewise, in the first image, the green sub-pixel $G_{2,1}$ signal of the second pixel group is retained while the green sub-pixel $G_{1,1}$ of the first pixel group is sacrificed. Moreover, the green sub-pixel position of the second pixel group is replaced as a high voltage signal obtained by table lookup, i.e., the first voltage signal $GH_{2,1}$, which can maintain the original image resolution. The sacrificed green sub-pixel position of the first pixel group is replaced as a low voltage signal obtained by table lookup, i.e., the second voltage signal $GL_{2,1}$, which can achieve the color shift compensation effect. In the second image, the green sub-pixel $G_{1,1}'$ of the first pixel group is retained while the green sub-pixel $G_{2,1}'$ of the second pixel group is sacrificed. Moreover, the green sub-pixel position of the first pixel group is replaced as a high voltage signal obtained by table lookup, i.e., the first voltage signal $GH_{1,1}'$, which can maintain the original image resolution. The sacrificed green sub-pixel position of the second pixel group is replaced as a low voltage signal obtained by table lookup, i.e., the second voltage signal $GL_{1,1}'$, which can achieve the color shift compensation effect.

As to such image distribution, although the first image and the second image each sacrifices a half of signals of the original image, the sequential presentation of original image input signals at adjacent timings makes the spatial equivalent resolution effect be not sacrificed. As a result, it can maintain the resolution during image content presentation at a frequency of original image input signals and also can achieve compensation effect of color shift, and thus there is no need of increasing the scanning frequency to increase the image content for maintaining the original image resolution as well as achieving the improvement of color shift. The exchange of positions of sub-pixels representing resolution signals in the adjacent two images can realize better resolution maintenance and retain the complete image resolution. It overcomes the defect of color difference caused by refractive index mismatch at large viewing angles of liquid crystal display and is suitable for TN, OCB, VA types of liquid crystal display panels, the process is simple and the product yield is high.

The blue sub-pixels mainly play a role of color presentation and have little impact on the presentation of viewing image resolution. The blue sub-pixels of adjacent first pixel group and second pixel group, for example $B_{1,1}$, $B_{2,1}$ in Table 1, may use one sub-pixel of them as a main image resolution representative signal.

In an exemplary embodiment, the blue sub-pixels of the first pixel group and the second pixel group in the first image, e.g., $B_{1,1}$, $B_{2,1}$ in Table 1, respectively are driven by the first voltage signal and the second voltage signal of the blue sub-pixel of the first pixel group in the first image, e.g., $BH_{1,1}$, $BL_{1,1}$. The blue sub-pixels of the first pixel group and the second pixel group in the second image, e.g., the $B_{1,1}'$, $B_{2,1}'$ in Table 2, are respectively driven by the second voltage signal and the first voltage signal of the blue sub-pixel of the second pixel group in the second image, e.g., $BL_{2,1}'$, $BH_{2,1}'$. The blue sub-pixels vary with the red sub-pixels, which is suitable for a display panel with a brighter green sub-pixel luminance as well as a display panel with an arrangement of red, green and blue in that order.

In an exemplary embodiment, the blue sub-pixels of the first pixel group and the second pixel group in the first image are respectively driven by the second voltage signal and the first voltage signal of the blue sub-pixel of the second pixel group in the first image; and the blue sub-pixels of the first pixel group and the second pixel group in the second image are respectively driven by the first voltage signal and the second voltage signal of the blue sub-pixel of the first pixel group in the second image. The blue sub-pixels vary with the green sub-pixels, which is suitable for a display panel with a brighter red sub-pixel luminance as well as a display panel with an arrangement of green, red and blue in that order.

In an exemplary embodiment, the blue sub-pixels may be driven by original image input signals.

In an embodiment, the first pixel group and the second pixel group may be located at a same column and adjacent to each other, i.e., vertically and adjacently disposed. For example, as shown in Table 1, the first pixel group is $R_{1,1}$, $G_{1,1}$ and $B_{1,1}$, and the second pixel group is $R_{2,1}$, $G_{2,1}$, and $B_{2,1}$. As shown in Table 4, in the first image, the red sub-pixel $R_{11}$ of the first pixel group is driven by the first voltage signal $RH_{1,1}$ of the red sub-pixel of the first pixel group, the red sub-pixel $R_{2,1}$ of the second pixel group is driven by the second voltage signal $RL_{1,1}$ of the red sub-pixel of the first pixel group. The green sub-pixel $G_{1,1}$ of the first pixel group is driven by the second voltage signal $GL_{2,1}$, of the green sub-pixel of the second pixel group, and the green sub-pixel $G_{2,1}$ of the second pixel group is driven by the first voltage signal $GH_{2,1}$, of the green sub-pixel of the second pixel group. Moreover, in adjacent two pairs of pixel groups, the first pixel group of one pair of pixel groups is disposed adjacent to the second pixel group of the other one pair of pixel groups, that is, the first pixel groups in adjacent two pairs of pixel groups are disposed in a staggered manner. For horizontally adjacent two pairs of pixel groups, the first pixel group in one pair is located above the second pixel group, and the first pixel group in other one pair is located below the second pixel group. The first pixel groups for adjacent pairs of pixel groups are disposed staggeredly.

TABLE 6

| $RH_{1,1}$ | $GL_{1,2}$ | $BH_{1,1}$ | $RL_{1,1}$ | $GH_{1,2}$ | $BL_{1,1}$ | $RH_{1,3}$ | $GL_{1,4}$ | $BH_{1,3}$ |
|---|---|---|---|---|---|---|---|---|
| $RL_{2,2}$ | $GH_{2,1}$ | $BL_{2,2}$ | $RH_{2,2}$ | $GL_{2,1}$ | $BH_{2,2}$ | $RL_{2,4}$ | $GH_{2,3}$ | $BL_{2,4}$ |
| $RH_{3,1}$ | $GL_{3,2}$ | $BH_{3,1}$ | $RL_{3,1}$ | $GH_{3,2}$ | $BL_{3,1}$ | $RH_{3,3}$ | $GL_{3,4}$ | $BH_{3,3}$ |
| $RL_{4,2}$ | $GH_{4,1}$ | $BL_{4,2}$ | $RH_{4,2}$ | $GL_{4,1}$ | $BH_{4,2}$ | $RL_{4,4}$ | $GH_{4,3}$ | $BL_{4,4}$ |
| $RH_{5,1}$ | $GL_{5,1}$ | $BH_{5,1}$ | $RL_{5,1}$ | $GH_{5,2}$ | $BL_{5,2}$ | $RH_{5,3}$ | $GL_{5,4}$ | $BH_{5,3}$ |

TABLE 7

| $RL_{1,2}'$ | $GH_{1,1}'$ | $BL_{1,2}'$ | $RH_{1,2}'$ | $GL_{1,1}'$ | $BH_{1,2}'$ | $RL_{1,4}'$ | $GH_{1,3}'$ | $BL_{1,4}'$ |
|---|---|---|---|---|---|---|---|---|
| $RH_{2,1}'$ | $GL_{2,2}'$ | $BH_{2,1}'$ | $RL_{2,1}'$ | $GH_{2,2}'$ | $BL_{2,1}'$ | $RH_{2,3}'$ | $GL_{2,4}'$ | $BH_{2,3}'$ |
| $RL_{3,2}'$ | $GH_{3,1}'$ | $BL_{3,2}'$ | $RH_{3,2}'$ | $GL_{3,1}'$ | $BH_{3,2}'$ | $RL_{3,4}'$ | $GH_{3,3}'$ | $BL_{3,4}'$ |
| $RH_{4,1}'$ | $GL_{4,2}'$ | $BH_{4,1}'$ | $RL_{4,1}'$ | $GH_{4,2}'$ | $BL_{4,1}'$ | $RH_{4,3}'$ | $GL_{4,4}'$ | $BH_{4,3}'$ |
| $RL_{5,2}'$ | $GH_{5,1}'$ | $BL_{5,2}'$ | $RH_{5,2}'$ | $GL_{5,1}'$ | $BH_{5,2}'$ | $RL_{5,4}'$ | $GH_{5,3}'$ | $BL_{5,4}'$ |

In an exemplary embodiment, the first pixel group and the second pixel group may be located in a same row and adjacent to each other, i.e., horizontally and adjacent disposed. For example, as shown in Table 1, the first pixel group is $R_{1,1}$, $G_{1,1}$ and $B_{1,1}$; and the second pixel group is $R_{1,2}$, $G_{1,2}$ and $B_{1,2}$. As shown in Table 6, the red sub-pixel $R_{11}$ of the first pixel group is driven by the first voltage signal $RH_{1,1}$ of the red sub-pixel of the first pixel group, and the red sub-pixel $R_{1,2}$ of the second pixel group is driven by the second voltage signal $RL_{1,1}$, of the red sub-pixel of the first pixel group. The green sub-pixel $G_{1,1}$ of the first pixel group is driven by the second voltage signal $GL_{1,2}$ of the green sub-pixel of the second pixel group, and the green sub-pixel $G_{1,2}$ of the second pixel group is driven by the first voltage signal $GH_{1,2}$ of the green sub-pixel of the second pixel group. Moreover, for adjacent two pairs of pixel groups, the first pixel group of one pair of pixel group is adjacent to the second pixel group of the other one pair of pixel groups; that is, the first pixel groups of adjacent two pairs of pixel groups are disposed staggeredly. For vertically adjacent two pairs of pixel groups, the first pixel group of one pair is on the right of the second pixel group, and the first pixel group of the other one pair is on the left of the second pixel group. The first pixel groups for adjacent pairs of pixel groups are staggeredly disposed.

In the above embodiments, a case of the first voltage signal being lower than the second voltage signal may be used to replace that the first voltage signal being greater than the second voltage signal instead.

In the above embodiments, positions of the first pixel group and the second pixel group in each pair of pixel groups may be exchanged.

The driving method of a display panel can address the drawback of color shift or color difference caused by refractive index mismatch at large viewing angles of the display panel. The display panel may be a TN (Twisted Nematic) type, an OCB (Optically Compensated Birefringence) type, or VA (Vertical Alignment) type liquid crystal display panel. The display panel also may for example be an OLED (Organic Light Emitting Diode) display panel, a QLED (Quantum Dots Light-Emitting Diodes) display panel or other display panel, and it is not limited to these. The display panel may be a RGB three-primary-color panel, a RGBW (red, green, blue and white) four-color panel or a RGBY (red, green, blue and yellow) four-color panel, and it is not limited to these. The driving method is also suitable for a situation of the display panel being a curved display panel.

Figure 5:
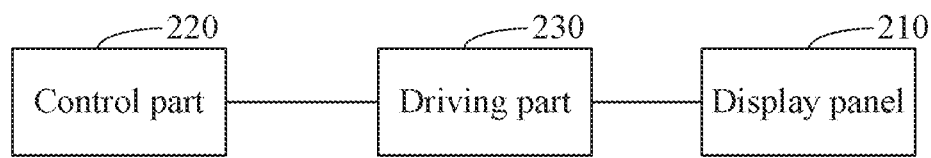
FIG. 5 is a block diagram of a display apparatus according to an embodiment.

Referring to FIG. 5, a display apparatus includes: a display panel 210, a control part 220 and a driving part 230.

Pixels on the display panel 210 are divided into multiple pairs of pixel groups. Each pair of pixel groups includes a first pixel group and a second pixel group adjacent to each other. Each of the first pixel group and the second pixel group includes a first sub-pixel, a second sub-pixel and a third sub-pixel.

The control part 220 is configured (i.e., structured and arranged) for obtaining unequal first and second voltage signals corresponding to sub-pixels by table lookup according to image input signals, so as to make a mixed luminance at a front viewing angle when the sub-pixels are alternately driven by the first voltage signal and the second voltage signal be equivalent to a luminance at the front viewing angle when the sub-pixels are driven by the image input signals, wherein the image input signals include a first image and a second image adjacent in timing.

The driving part 230 is connected to the control part 220 and the display panel 210 individually.

The driving part 230 is configured for using the first voltage signal and the second voltage signal of the first sub-pixel of the first pixel group in the first image to respectively drive the first sub-pixels of the first pixel group and the second pixel group in the first image, and using the second voltage signal and the first voltage signal of the second sub-pixel of the second pixel group in the first image to respectively drive the second sub-pixels of the first pixel group and the second pixel group in the first image.

The driving part 230 is configured for using the second voltage signal and the first voltage signal of the first sub-pixel of the second pixel group in the second image to respectively drive the first sub-pixels of the first pixel group and the second pixel group in the second image, and using the first voltage signal and the second voltage signal of the second sub-pixel of the first pixel group in the second image to respectively drive the second sub-pixels of the first pixel group and the second pixel group in the second image.

In an exemplary embodiment, the first sub-pixel is a red sub-pixel, and the second sub-pixel is a green sub-pixel. In RGB three-primary-color sub-pixels, because luminance signals of the red sub-pixel and the green sub-pixel are brighter than a luminance signal of the blue sub-pixel, the red sub-pixel and the green sub-pixel would directly affect the presentation of viewing image resolution. The illustrated embodiment not only can maintain resolution but also achieve color shift compensation during image content presentation at the frequency of original image input signals, and moreover the exchange of positions of sub-pixels representing resolution signals in the first and second images with adjacent timings can realize better resolution maintenance and retain a complete image resolution.

For example, the first voltage signal is greater than the second voltage signal.

In an embodiment, the third sub-pixel is a blue sub-pixel. The driving part 230 is further configured for using the first voltage signal and the second voltage signal of the blue sub-pixel of the first pixel group in the first image, e.g., $BH_{1,1}$, $BL_{1,1}$ in Table 4, to respectively drive the blue sub-pixels of the first pixel group and the second pixel group in the first image, e.g., $B_{1,1}$, $B_{2,1}$ in Table 1. The driving part 230 is further configured for using the second voltage signal and the first voltage signal of the blue sub-pixel of the second pixel group in the second image, e.g., $BL_{2,1}'$, $BH_{2,1}'$, in Table 5, to respectively drive the blue sub-pixels of the first pixel group and the second pixel group in the second image, e.g., the $B_{1,1}'$, $B_{2,1}'$ in Table 2. The blue sub-pixels vary with the red sub-pixels, which is suitable for a display panel with a brighter green sub-pixel luminance as well as a display panel with an arrangement of red, green and blue in that order.

In an exemplary embodiment, the driving part 230 is further configured for using the second voltage signal and the first voltage signal of the blue sub-pixel of the second pixel group in the first image to respectively drive the blue sub-pixels of the first pixel group and the second pixel group in the first image. The driving part 230 is further configured for using the first voltage signal and the second voltage signal of the blue sub-pixel of the first pixel group in the second image to respectively drive the blue sub-pixels of the first pixel group and the second pixel group in the second image. The blue sub-pixels vary with the green sub-pixels, which is suitable for a display panel with a brighter red sub-pixel luminance as well as a display panel with an arrangement of green, red and blue in that order.

In an exemplary embodiment, the blue sub-pixels may be driven by original image input signals instead.

In an embodiment, the first pixel group and the second pixel group may be located in a same column and adjacent to each other. i.e., vertically and adjacently disposed. For example, as shown in Table 1, the first pixel group is $R_{1,1}$, $G_{1,1}$, and $B_{1,1}$, and the second pixel group is $R_{2,1}$, $G_{2,1}$ and $B_{2,1}$. As shown in Table 4, in the first image, the red sub-pixel $R_{11}$ of the first pixel group is driven by the first voltage signal $RH_{1,1}$ of the red sub-pixel of the first pixel group, the red sub-pixel $R_{2,1}$ of the second pixel group is driven by the second voltage signal $RL_{1,1}$, of the red sub-pixel of the first pixel group. The green sub-pixel $G_{1,1}$ of the first pixel group is driven by the second voltage signal $GL_{1,1}$, of the green sub-pixel of the second pixel group, and the green sub-pixel $G_{2,1}$ of the second pixel group is driven by the first voltage signal $GH_{2,1}$ of the green sub-pixel of the second pixel group. Moreover, in adjacent two pairs of pixel groups, the first pixel group of one pair of pixel groups is disposed adjacent to the second pixel group of the other one pair of pixel groups, that is, the first pixel groups in adjacent two pairs of pixel groups are disposed in a staggered manner. For horizontally adjacent two pairs of pixel groups, the first pixel group in one pair is located above the second pixel group, and the first pixel group in other one pair is located below the second pixel group. The first pixel groups for adjacent pairs of pixel groups are disposed staggeredly. For vertically adjacent two pairs of pixel groups, the first pixel groups both are located above or below the second pixel groups.

In an exemplary embodiment, the first pixel group and the second pixel group may be located in a same row and adjacent to each other, i.e., horizontally and adjacent disposed. For example, as shown in Table 1, the first pixel group is $R_{1,1}$, $G_{1,1}$ and $B_{1,1}$; and the second pixel group is $R_{1,2}$, $G_{1,2}$ and $B_{1,2}$. As shown in Table 6, the red sub-pixel $R_{1,1}$ of the first pixel group is driven by the first voltage signal $RH_{1,1}$ of the red sub-pixel of the first pixel group, and the red sub-pixel $R_{1,2}$ of the second pixel group is driven by the second voltage signal $RL_{1,1}$ of the red sub-pixel of the first pixel group. The green sub-pixel $G_{1,1}$ of the first pixel group is driven by the second voltage signal $GL_{1,2}$ of the green sub-pixel of the second pixel group, and the green sub-pixel $G_{1,2}$ of the second pixel group is driven by the first voltage signal $GH_{1,2}$ of the green sub-pixel of the second pixel group. Moreover, for adjacent two pairs of pixel groups, the first pixel group of one pair of pixel group is adjacent to the second pixel group of the other one pair of pixel groups; that is, the first pixel groups of adjacent two pairs of pixel groups are disposed staggeredly. For vertically adjacent two pairs of pixel groups, the first pixel group of one pair is on the right of the second pixel group, and the first pixel group of the other one pair is on the left of the second pixel group. The first pixel groups for adjacent pairs of pixel groups are staggeredly disposed.

In the above embodiments, a case of the first voltage signal being lower than the second voltage signal may be used to replace that the first voltage signal being greater than the second voltage signal instead.

The driving apparatus can address the drawback of color shift or color difference caused by refractive index mismatch at large viewing angles of the display panel. The display panel may be a TN type, an OCB type, or VA type liquid crystal display panel. The display panel also may for example be an OLED display panel, a QLED display panel, a curved panel or other display panel, and it is not limited to these. The display panel may be a RGB three-primary-color panel, a RGBW four-color panel or a RGBY four-color panel, and it is not limited to these.

In the above embodiments, the first sub-pixel, the second sub-pixel and the third sub-pixel included in each of the first pixel group and the second pixel group may be one or multiple in quantity.

The technical features of the above embodiments can be combined arbitrarily. In order to make the description concise, not all possible combinations of the technical features in the above embodiments are described. However, as long as there is no contradiction in a combination of these technical features, it should be considered as the scope of this specification.

In the several embodiments provided by the disclosure, it should be understood that the described systems, devices and/or methods can be realized in other ways. For example, the embodiments of devices described above are merely illustrative. For example, division of units is only a logical functional division, and other division manner may be adopted in actual implementation, for example multiple units or components can be combined together or integrated into another system, or some features can be omitted or not implemented. In addition, the coupling or direct coupling or communication connection shown or discussed may be indirect coupling or communication connection through some interfaces, devices or units, which may be electrical, mechanical or otherwise.

The units described as separation parts may or may not be physically separated, and the parts shown as units may or may not be physical units, i.e., may be located in one place or distributed over multiple network units. Some or all of the units can be selected according to actual needs to achieve the purpose of the embodiments of the disclosure.

In addition, each of the functional units in the embodiments of the disclosure may be integrated in one processing unit, or each of the units may exist alone physically, or two or more units may be integrated in one unit. The integrated unit can be implemented in the form of hardware or in the form of hardware plus a software functional unit(s).

The integrated unit implemented in the form of a software functional unit(s) may be stored in a computer-readable storage medium. The above software functional unit(s) is/are stored in a storage medium and include(s) several instructions for causing one or more processors of a computer device (which may be a personal computer, a server, or a network device) to execute some steps of the method described in the above embodiments of the disclosure. The foregoing storage medium may be any one various types of media can store program codes such as a USB disk, a mobile hard disk, a read-only memory (ROM), a random access memory (RAM), a magnetic disk or an optical disk.

Finally, it should be noted that the above embodiments are merely illustrative of technical solutions of the disclosure and are not intended to be limiting thereof. Although the disclosure is described in detail with reference to the foregoing embodiments, a person skilled in the art should be understood that the technical solutions described in the foregoing embodiments can be modified or some of technical features can be equivalently replaced, and these modifications or replacements do not depart from the spirit and scope of the technical solutions of various embodiments of the disclosure.

What is claimed is:

1. A driving method of a display panel, comprising:
    dividing pixels on the display panel into a plurality of pairs of pixel groups, wherein each pair of the pixel groups comprises a first pixel group and a second pixel group, and each of the first pixel group and the second pixel group comprises a first sub-pixel, a second sub-pixel and a third sub-pixel;
    obtaining a first voltage signal and a second voltage signal of each of sub-pixels including the first through third sub-pixels by table lookup according to image input signals, so as to make a mixed luminance at a front viewing angle when the sub-pixels are alternately driven by the first voltage signal and the second voltage be equivalent to a luminance at the front viewing angle when the sub-pixels are driven by the image input signals, wherein the image input signals comprise a first image and a second image adjacent in timing, and the first voltage signal is unequal to the second voltage signal;
    using the first voltage signal and the second voltage signal of the first sub-pixel of the first pixel group in the first image to respectively drive the first sub-pixel of the first pixel group and the first sub-pixel of the second pixel group in the first image, and using the second voltage signal and the first voltage signal of the second sub-pixel of the second pixel group in the first image to respectively drive the second sub-pixel of the first pixel group and the second sub-pixel of the second pixel group in the first image;
    using the second voltage signal and the first voltage signal of the first sub-pixel of the second pixel group in the second image to respectively drive the first sub-pixel of the first pixel group and the first sub-pixel of the second pixel group in the second image, and using the first voltage signal and the second voltage signal of the second sub-pixel of the first pixel group in the second image to respectively drive the second sub-pixel of the first pixel group and the second sub-pixel of the second pixel group in the second image;
    wherein the first sub-pixel is a red sub-pixel, and the second sub-pixel is a green sub-pixel;
    wherein the third sub-pixel is a blue sub-pixel, and the driving method further comprises:
        using the first voltage signal and the second voltage signal of the blue sub-pixel of the first pixel group in the first image to respectively drive the blue sub-pixel of the first pixel group and the blue sub-pixel of the second pixel group in the first image, and using the second voltage signal and the first voltage signal of the blue sub-pixel of the second pixel group in the second image to respectively drive the blue sub-pixel of the first pixel group and the blue sub-pixel of the second pixel group in the second image; or
        using the second voltage signal and the first voltage signal of the blue sub-pixel of the second pixel group in the first image to respectively drive the blue sub-pixel of the first pixel group and the blue sub-pixel of the second pixel group in the first image, and using the first voltage signal and the second voltage signal of the blue sub-pixel of the first pixel group in the second image to respectively drive the blue sub-pixel of the first pixel group and the blue sub-pixel of the second pixel group in the second image.

2. The driving method of a display panel as claimed in claim 1, wherein the first pixel group and the second pixel group are located in a same row and adjacent to each other; and in adjacent two pairs of pixel groups, the first pixel group of one pair of pixel groups is disposed adjacent to the second pixel group of the other pair of pixel groups.

3. The driving method of a display panel as claimed in claim 1, wherein the first pixel group and the second pixel group are located in a same column and adjacent to each other; and in adjacent two pairs of pixel groups, the first pixel group of one pair of pixel groups is disposed adjacent to the second pixel group of the other pair of pixel groups.

4. A display apparatus comprising:
    a display panel, wherein pixels on the display panel are divided into a plurality of pairs of pixel groups, each pair of the pixel groups comprises a first pixel group and a second pixel group, and each of the first pixel group and the second pixel group comprises a first sub-pixel, a second sub-pixel and a third sub-pixel;
    a control part, configured to obtain a first voltage signal and a second voltage signal of each of sub-pixels including the first through third sub-pixels by table lookup according to image input signals, so as to make a mixed luminance at a front viewing angle when the sub-pixels are alternately driven by the first voltage signal and the second voltage be equivalent to a luminance at the front viewing angle when the sub-pixels are driven by the image input signals, wherein the image input signals comprise a first image and a second image adjacent in timing, and the first voltage signal is unequal to the second voltage signal;

a driving part, connected to the control part and the display panel and configured to:

use the first voltage signal and the second voltage signal of the first sub-pixel of the first pixel group in the first image to respectively drive the first sub-pixel of the first pixel group and the first sub-pixel of the second pixel group in the first image, use the second voltage signal and the first voltage signal of the second sub-pixel of the second pixel group in the first image to respectively drive the second sub-pixel of the first pixel group and the second sub-pixel of the second pixel group in the first image, use the second voltage signal and the first voltage signal of the first sub-pixel of the second pixel group in the second image to respectively drive the first sub-pixel of the first pixel group and the first sub-pixel of the second pixel group in the second image, and use the first voltage signal and the second voltage signal of the second sub-pixel of the first pixel group in the second image to respectively drive the second sub-pixel of the first pixel group and the second sub-pixel of the second pixel group in the second image.

5. The display apparatus as claimed in claim 4, wherein the first sub-pixel is a red sub-pixel, and the second sub-pixel is a green sub-pixel.

6. The display apparatus as claimed in claim 5, wherein the third sub-pixel is a blue sub-pixel; and the driving part is further configured to:

use the first voltage signal and the second voltage signal of the blue sub-pixel of the first pixel group in the first image to respectively drive the blue sub-pixel of the first pixel group and the blue sub-pixel of the second pixel group in the first image, and use the second voltage signal and the first voltage signal of the blue sub-pixel of the second pixel group in the second image to respectively drive the blue sub-pixel of the first pixel group and the blue sub-pixel of the second pixel group in the second image.

7. The display apparatus as claimed in claim 5, wherein the third sub-pixel is a blue sub-pixel; and the driving part is further configured to:

use the second voltage signal and the first voltage signal of the blue sub-pixel of the second pixel group in the first image to respectively drive the blue sub-pixel of the first pixel group and the blue sub-pixel of the second pixel group in the first image, and use the first voltage signal and the second voltage signal of the blue sub-pixel of the first pixel group in the second image to respectively drive the blue sub-pixel of the first pixel group and the blue sub-pixel of the second pixel group in the second image.

8. The display apparatus as claimed in claim 5, wherein the third sub-pixel is a blue sub-pixel, and the blue sub-pixel is driven by original image input signals.

9. The display apparatus as claimed in claim 4, wherein the first pixel group and the second pixel group are located in a same row and adjacent to each other; and in adjacent two pairs of pixel groups, the first pixel group of one pair of pixel groups is disposed adjacent to the second pixel group of the other pair of pixel groups.

10. The display apparatus as claimed in claim 4, wherein the first pixel group and the second pixel group are located in a same column and adjacent to each other; and in adjacent two pairs of pixel groups, the first pixel group of one pair of pixel groups is disposed adjacent to the second pixel group of the other pair of pixel groups.

11. The display apparatus as claimed in claim 4, wherein the display panel is a twisted nematic type liquid crystal display panel, an optically compensated birefringence type liquid crystal display panel, or a vertical alignment type liquid crystal display panel.

12. The display apparatus as claimed in claim 4, wherein the display panel is a RGB three-primary-color panel, a RGBW four-color panel or a RGBY four-color panel.

13. A display apparatus comprising:

a display panel, wherein pixels on the display panel are divided into a plurality of pairs of pixel groups, each pair of the pixel groups comprises a first pixel group and a second pixel group adjacent to each other, each of the first pixel group and the second pixel group comprises a first sub-pixel, a second sub-pixel and a third sub-pixel; the first pixel group and the second pixel group are adjacently disposed in a same row or a same column; in adjacent two pairs of pixel groups, the first pixel group in one pair of pixel groups is adjacent to the second pixel group in the other one pair of pixel groups; the first sub-pixel is a red sub-pixel, the second sub-pixel is a green sub-pixel, and the third sub-pixel is a blue sub-pixel;

a control part, configured to obtain a first voltage signal and a second voltage signal of each of sub-pixels including the first through third sub-pixels by table lookup according to image input signals, so as to make a mixed luminance at a front viewing angle when the sub-pixels are alternately driven by the first voltage signal and the second voltage be equivalent to a luminance at the front viewing angle when the sub-pixels are driven by the image input signals, wherein the image input signals comprise a first image and a second image adjacent in timing, and the first voltage signal is unequal to the second voltage signal;

a driving part, connected to the control part and the display panel and configured to:

use the first voltage signal and the second voltage signal of the first sub-pixel of the first pixel group in the first image to respectively drive the first sub-pixel of the first pixel group and the first sub-pixel of the second pixel group in the first image, use the second voltage signal and the first voltage signal of the second sub-pixel of the second pixel group in the first image to respectively drive the second sub-pixel of the first pixel group and the second sub-pixel of the second pixel group in the first image, use the second voltage signal and the first voltage signal of the first sub-pixel of the second pixel group in the second image to respectively drive the first sub-pixel of the first pixel group and the first sub-pixel of the second pixel group in the second image, and use the first voltage signal and the second voltage signal of the second sub-pixel of the first pixel group in the second image to respectively drive the second sub-pixel of the first pixel group and the second sub-pixel of the second pixel group in the second image;

wherein the driving part is further configured to:

use the first voltage signal and the second voltage signal of the blue sub-pixel of the first pixel group in the first image to respectively drive the blue sub-pixel of the first pixel group and the blue sub-pixel of the second pixel group in the first image, and use the second voltage signal and the first voltage signal of the blue sub-pixel of the second pixel group in the second image to respectively drive the blue sub-pixel of the first pixel group and the blue sub-pixel of the second pixel group in the second image; or use the second voltage signal and the first voltage signal of the blue sub-pixel of the second pixel group in the first image to respectively drive the blue sub-pixel of the first pixel group and the blue sub-pixel of the second pixel group in the first image, and use the first voltage signal and the second voltage signal of the blue sub-pixel of the first pixel group in the second image to respectively drive the blue sub-pixel of the first pixel group and the blue sub-pixel of the second pixel group in the second image.

14. The display apparatus as claimed in claim 13, wherein the first pixel group and the second pixel group are located in the same row and adjacent to each other; and in adjacent two pairs of pixel groups, the first pixel group of one pair of pixel groups is disposed adjacent to the second pixel group of the other pair of pixel groups.

15. The display apparatus as claimed in claim 13, wherein the first pixel group and the second pixel group are located in the same column and adjacent to each other; and in adjacent two pairs of pixel groups, the first pixel group of one pair of pixel groups is disposed adjacent to the second pixel group of the other pair of pixel groups.

16. The driving method of a display panel as claimed in claim 1, wherein the first voltage signal is one of a high voltage signal and a low voltage signal, and the second voltage signal is the other one of the high voltage signal and the low voltage signal.

17. The display apparatus as claimed in claim 4, wherein the first voltage signal is one of a high voltage signal and a low voltage signal, and the second voltage signal is the other one of the high voltage signal and the low voltage signal.

18. The display apparatus as claimed in claim 13, wherein the first voltage signal is one of a high voltage signal and a low voltage signal, and the second voltage signal is the other one of the high voltage signal and the low voltage signal.

* * * * *